Feb. 21, 1928.
H. P. MEREDITH ET AL
1,659,660
MEANS AND METHOD FOR SHIPPING AUTOMOBILE BODIES
Filed April 2, 1925     2 Sheets-Sheet 1
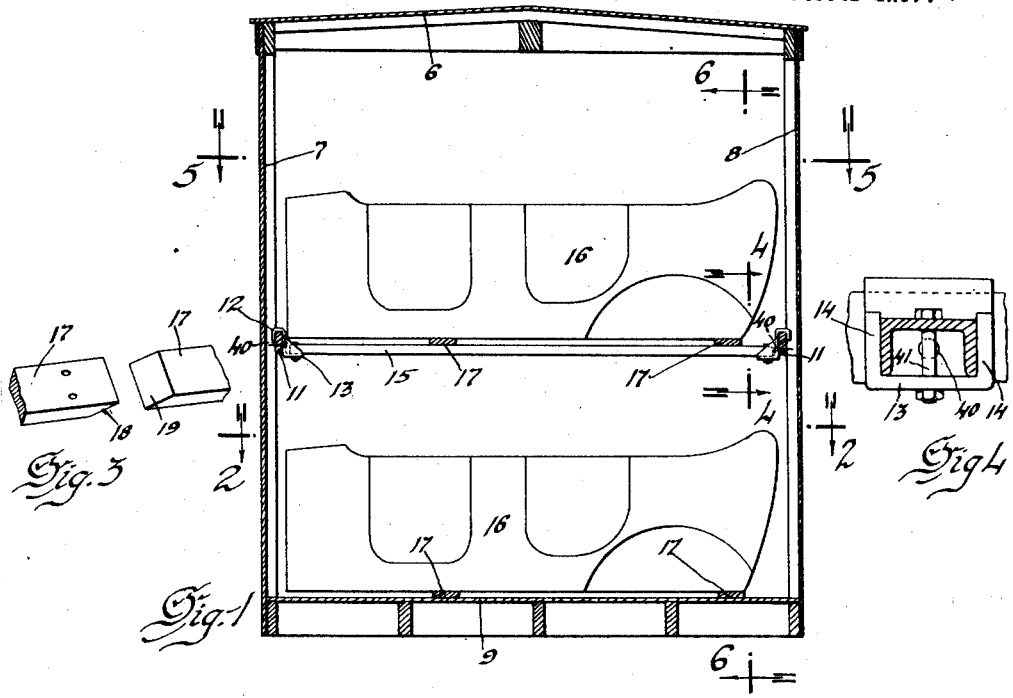
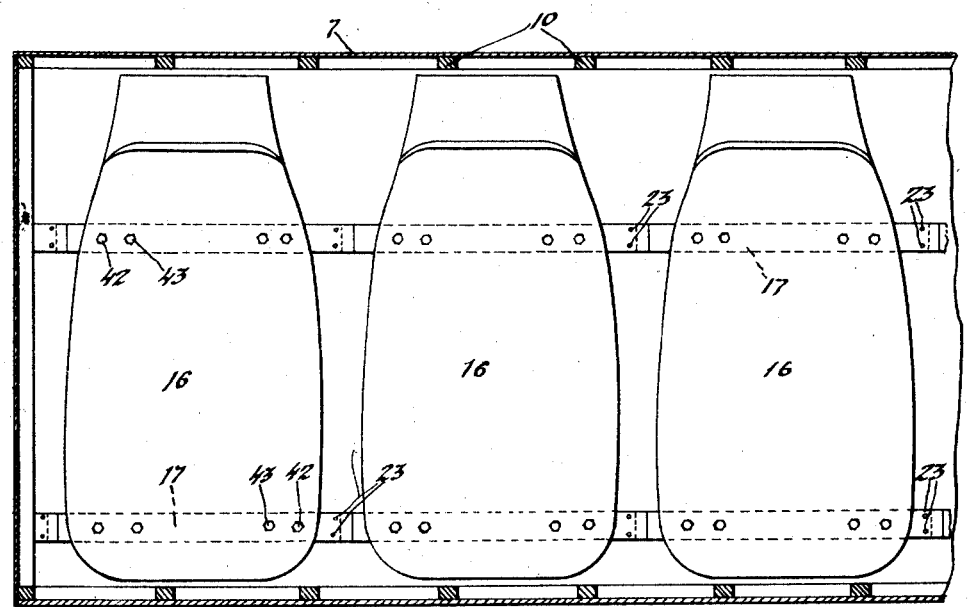
INVENTORS
Harry P. Meredith &
Leo I. Friedlaender
BY
                   ATTORNEY Feb. 21, 1928.   
H. P. MEREDITH ET AL   
1,659,660  
MEANS AND METHOD FOR SHIPPING AUTOMOBILE BODIES  
Filed April 2, 1925    2 Sheets-Sheet 2

INVENTORS
Harry P. Meredith &
Geo. I. Friedlaender
BY
ATTORNEY

Patented Feb. 21, 1928.

1,659,660

UNITED STATES PATENT OFFICE.

HARRY P. MEREDITH AND LEO I. FRIEDLAENDER, OF DETROIT, MICHIGAN.

MEANS AND METHOD FOR SHIPPING AUTOMOBILE BODIES.

Application filed April 2, 1925. Serial No. 20,045.

It is the primary object of our invention to provide simple and economical means for the shipment of automobile bodies in freight cars, to so arrange the bodies in the car as to accommodate a maximum number of the same, and to provide for easy and quick loading and unloading.

More specifically, the objects of our invention are to provide means whereby automobile bodies are loaded transversely of a freight car, in double decked relation, and means whereby each successive body is secured in place by bolts, nails or the like, applied on one side only thereof, which side shall be that nearest the exit door of the freight car, whereby persons loading the bodies need not go through the same to secure or loosen the securing means on the side of the body farthest removed from the exit door of the freight car.

It is a still further specific object of our invention to provide efficient and economical means for securing the bodies in place over bodies loaded on the floor of the car.

With the above and other objects in view, our invention consists in the arrangement, combination and construction of the various parts of our improved device and the methods utilized therein, as described in the specification, claimed in our claims, and shown in the accompanying drawings in which:

Fig. 1 is a central sectional view of a freight car, on the line of the exit doors thereof, showing our invention.

Fig. 2 is a view taken on line 2—2 of Fig. 1.

Fig. 3 is a detailed view showing the securing means utilized on one side of bodies being shipped.

Fig. 4 is a sectional view taken on line 4—4 of Fig. 1.

Figure 5:
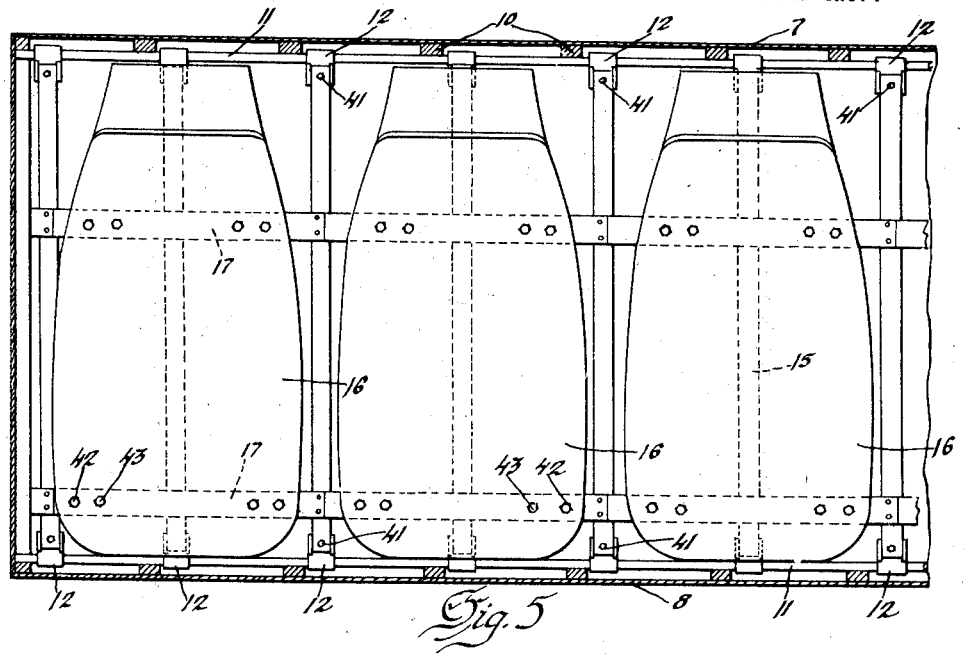
Fig. 5 is a sectional view taken on line 5—5 of Fig. 1.
Figure 6:
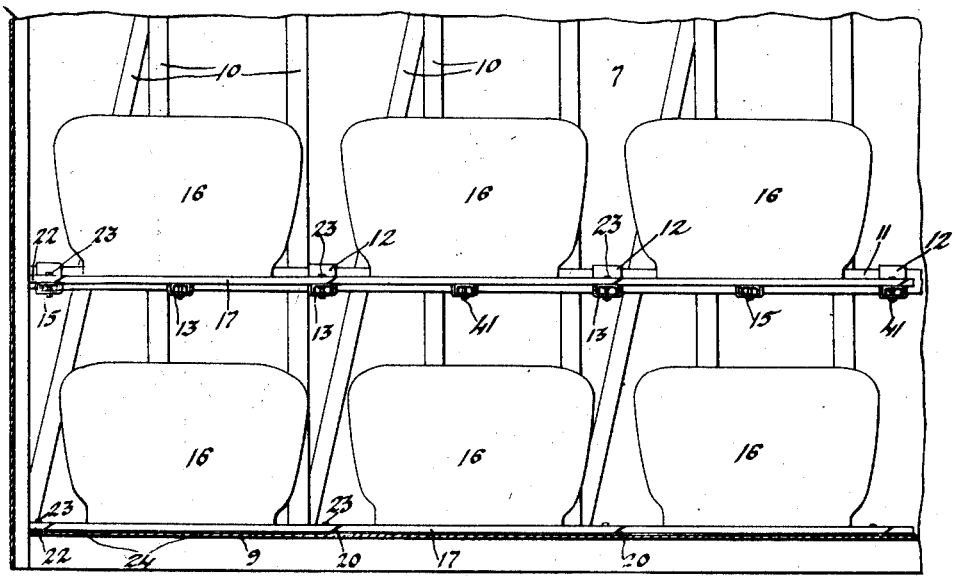
Fig. 6 is a sectional view taken on line 6—6 of Fig. 1.

We have shown a freight car having a top 6, sides 7 and 8, and a floor 9. The sides 7 and 8 are provided with usual support and brace members 10, extending vertically thereof. A metal strip 11 is secured to the members 10, extending longitudinally of the freight car.

Positioned at intervals along the strips 11 are a plurality of brackets consisting of a hook portion 12 adapted to engage over the strips 11 and a pocket portion integral with the hook portion, having a bottom 13 and side flanges 14. The hook portion 12 may be definitely located on the strip 11 by screws, bolts or nails 40. In case nails are used, they will extend into the side of the freight car. Screws will extend only into the strip and bolts will extend through the strip. Seated in these pockets and extending transversely of the freight car are channel members 15. These channel members form in effect a second floor in the freight car, or supporting elements for bodies to be disposed over those positioned on the floor of the car, and are secured against vertical movements in the pockets by bolts 41.

We have shown a plurality of automobile bodies indicated generally as 16, some of which are mounted on the floor of the freight car and some on the channel bars 15. All of the bodies are provided with cross pieces 17 secured to the bottoms thereof, and by which the bodies may be carried. These cross pieces have two openings, 42 and 43, adjacent each end thereof whereby one of said openings will align with means on the body for securing the two together whether the piece is used in the front or the back of the body.

In other words, it frequently happens that the attaching means in the rear of the body are spaced greater than those at the front, and a pair of openings permit use of the piece in either the front or back. The ends of the cross pieces 17 are cut on an angle, the angles on the ends of the left hand side of the body (considering the freight car door to be on the right) being opposite to those on the right hand side of the body as indicated at 18 and 19 in Fig. 3, so that when the ends of the cross pieces are brought into abutting relation, a joint 20 is formed.

When securing the bodies in a freight car, a short piece 22 is first secured in the end of the car by nails or bolts 23, extending to the floor 9 for the lower bodies, and into the first channel beam 15 for the upper bodies. This piece 22 has its free end cut on an angle similar to the angle on the right hand side of the cross pieces under the body, and the left hand sides of the cross pieces are brought to bear against such free ends, thus forming the first joint 20 and preventing vertical displacement of the body 16 at this point. The right hand end of the cross piece 17 of the first body may then be secured by similar bolts or nails 23 to the floor or to the channel beam, thus securing the body in place. This process is repeated, the joints 20 between each set of strips 17 being made, until a series of bodies extending from the end of the freight car to the exit door thereof are in place, it being possible to secure all of the bodies in place from the exit door side thereof without necessitating the workman passing through the automobile bodies to secure the side farthest removed from the exit door.

In practice the bodies in the upper part of the freight car are loaded first and then those on the floor of the freight car are secured in place. When unloading the lower bodies are first removed and then the upper bodies are removed by lifting them, removing the channel beams, and lowering them to the floor.

It will be readily seen that the channel beams 15 are securely held against accidental displacement but may be easily removed by simply lifting them from the pockets.

It will be apparent that the bodies are secured to the strips 17 before the strips are secured in place, and inasmuch as often times the floors of freight cars are uneven so that some difficulty is experienced in sliding the bodies on their cross pieces 17 across the floor, we have provided buttons 24 on the bottom of the cross pieces 17, adapted to act as casters to better facilitate sliding the bodies across the floor of the freight car.

It will be obvious that various changes may be made in the arrangement, combination and construction of the various parts of our improved device and of the methods utilized by them, without departing from the spirit of our invention, and it is our intention to cover by our claims, such changes as may be reasonably included within the scope thereof.

What we claim is:

1. In combination an automobile body having a member secured to the bottom thereof and extending across the body, a second member adjacent one end of said first member, a supporting element upon which said members rest and to which said second member is attached and means for securing the adjacent end of said first member to said element consisting of disposing a portion of said first member under a portion of the second member.

2. The method of securing an automobile body to and releasing the same from a supporting element which consists in securing both sides of said body to the element, then releasing the securing means on one side only and then releasing the other securing means by pulling the body from the said first side thereof.

3. In combination, supporting means, automobile bodies having cross pieces thereunder and aligned on said supporting means, said cross pieces each being secured to said supporting means on one side of said bodies, and means for securing the other ends of said cross pieces consisting of disposing portions of them under the adjacent ends of cross pieces under adjacent bodies which are secured to said supporting means.

4. In combination, supporting means, a pair of members secured to said supporting means and having a portion of their bottoms, at one end thereof, cut away from their tops at the same ends, an automobile body having a pair of members secured thereto resting on said supporting means, adjacent ends of said members being cut away at the tops thereof from the bottoms thereof, said ends being inserted in the cut away portions of said first members, and means for securing the other ends of said second pair of said supporting means.

5. In combination, an automobile body, a pair of spaced cross pieces under said body, a pair of spaced attaching means on said body for each of said pieces, one pair being differently spaced from the other, and four spaced openings in said cross pieces permitting securing of either of said pieces to either of said pairs of attaching means.

6. In combination, a freight car having longitudinally disposed strips on the side walls thereof, pockets secured to said strips, members extended across said car having their ends disposed in said pockets, and automobile bodies supported by said members.

7. In combination, a freight car having longitudinally disposed strips on the side walls thereof, hooks engaging said strips and having pockets on the free ends thereof, members extending across said car having their ends disposed in said pockets, and automobile bodies supported by said members.

8. In combination, a freight car having longitudinally disposed strips on the side walls thereof, brackets having hooks on one end thereof engaging said strips, and a pocket having a bottom and side walls on the other end thereof, cross pieces extended across said car and having their ends disposed in said pockets, and automobile bodies supported by said members.

HARRY P. MEREDITH.
LEO I. FRIEDLAENDER.